Nov. 29, 1955 E. F. BOUVIER 2,725,109
ENGINE AND TRANSMISSION DRIVE ASSEMBLY FOR MARSH BUGGY
Filed Aug. 11, 1954 4 Sheets-Sheet 1

Ernest F. Bouvier
INVENTOR.

BY *Clarence A. O'Brien*
*and Harvey B. Jacobson*
Attorneys

Nov. 29, 1955    E. F. BOUVIER    2,725,109
ENGINE AND TRANSMISSION DRIVE ASSEMBLY FOR MARSH BUGGY
Filed Aug. 11, 1954    4 Sheets-Sheet 2

Ernest F. Bouvier
INVENTOR.

Nov. 29, 1955     E. F. BOUVIER     2,725,109
ENGINE AND TRANSMISSION DRIVE ASSEMBLY FOR MARSH BUGGY
Filed Aug. 11, 1954     4 Sheets-Sheet 3

*Ernest F. Bouvier*
INVENTOR.

BY *Clarence A. O'Brien*
*and Harvey B. Jacobson*
Attorneys

Nov. 29, 1955     E. F. BOUVIER     2,725,109
ENGINE AND TRANSMISSION DRIVE ASSEMBLY FOR MARSH BUGGY
Filed Aug. 11, 1954     4 Sheets—Sheet 4

Ernest F. Bouvier
INVENTOR.

BY *Clarence A. O'Brien*
*and Harvey B. Jacobson*
Attorneys

United States Patent Office 2,725,109
Patented Nov. 29, 1955

2,725,109
ENGINE AND TRANSMISSION DRIVE ASSEMBLY FOR MARSH BUGGY

Ernest F. Bouvier, Larose, La.

Application August 11, 1954, Serial No. 449,070

4 Claims. (Cl. 180—6.48)

This invention relates generally to amphibious vehicles, and has for its primary object the provision of a vehicle of this type which is capable of extreme maneuverability and of exerting tremendous drawbar pull for manipulation and operation within marshy areas or on water for the purpose of laying pipe line, performing dredging operations, and for many other operations.

Another object of this invention is to provide improvements in amphibious vehicles for the purpose of transporting men, tools and supplies to and from locations in a marsh or a combination of marsh, water and land, and to provide a base of operations for men, tools and supplies as well as furnishing lifting and pulling power in marshy places where traction with conventional vehicles is difficult or impossible.

Still another object of this invention is to provide improvements in amphibious vehicles wherein a rigid and sturdy framework assembly is established and wherein as much weight as is possible is located in a position which will be close to the waterline when the vehicle is fully loaded and operative, whereby pulling and hoisting operations may be performed with the least shifting of weight between the supporting wheels of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
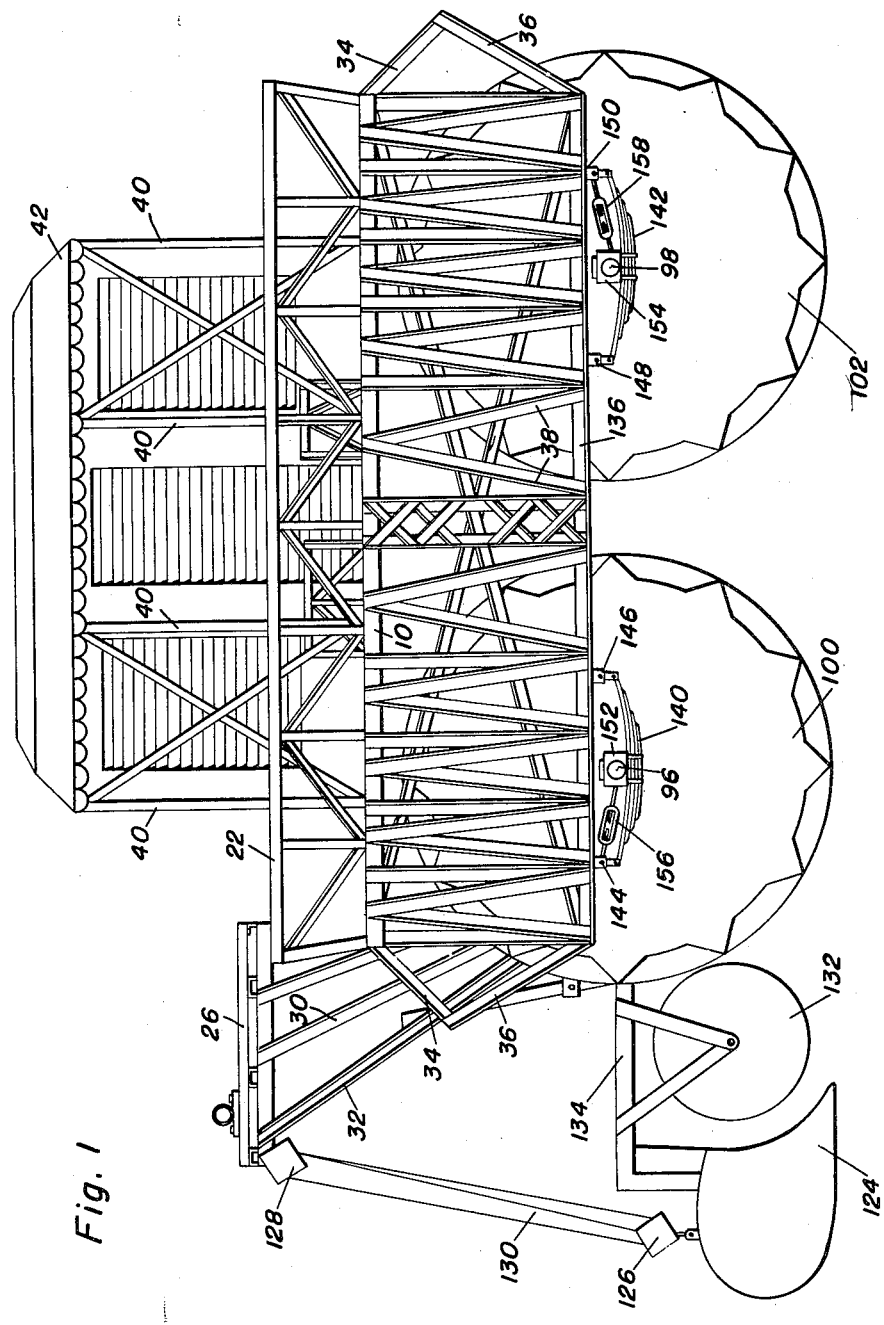
Figure 1 is a side elevational view of a vehicle constructed in accordance with this invention.
Figure 2:
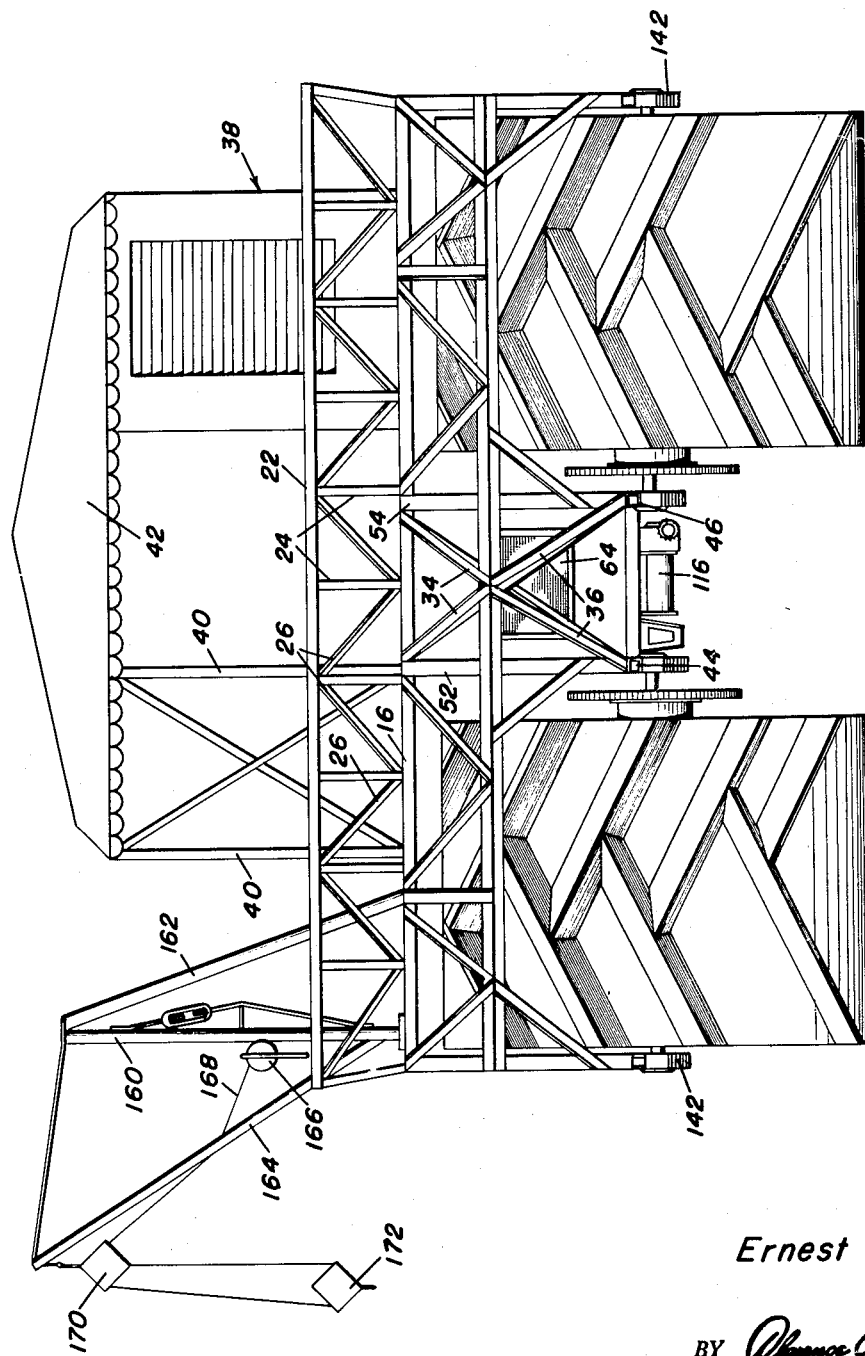
Figure 2 is a front elevational view of the assembly shown in Figure 1.
Figure 3:
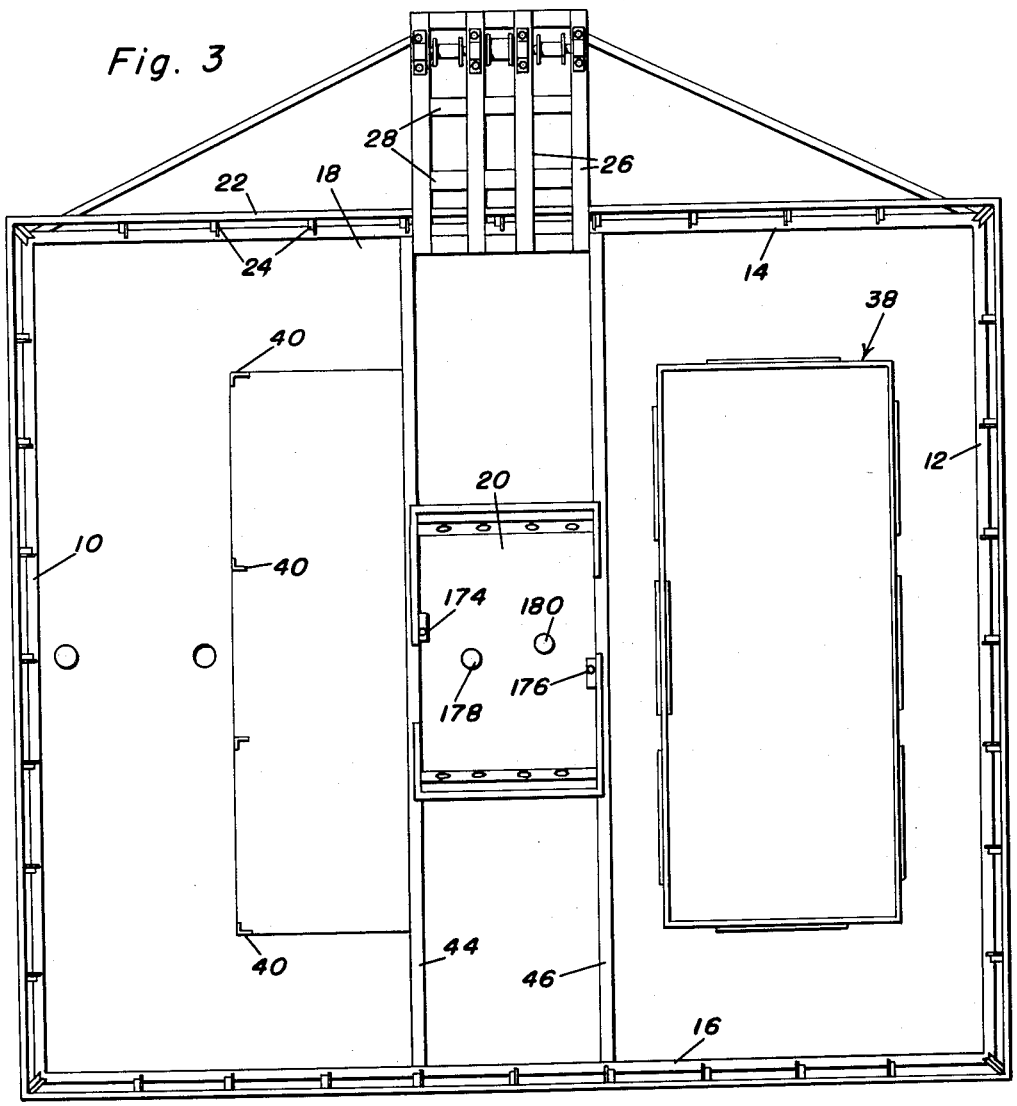
Figure 3 is a top plan view of the assembly shown in Figure 1.

Referring more particularly to the drawings, and at this point, more particularly to Figures 1–3, the vehicle will be seen to consist of a main frame section comprised essentially of spaced side frame members 10 and 12 which are rigidly interconnected at their opposite ends by the end frame members 14 and 16. These various frame members are suitably interconnected by reinforcing or bracing members, such as to provide an extremely rigid main frame section. The main frame section is covered with metallic plate preferably of such material as aluminum to provide the deck 18 which covers the entire main frame section with the exception of a small central portion thereof which is provided with a sunken operator's pit 20, the purpose of which will be presently apparent.

A rail 22 extends peripherally around the main frame section and is suitably connected thereto by means of the uprights 24 and cross-brace members 26 for the purpose of providing a retaining member and as a support for men or equipment on the deck 18.

Disposed at the rear of the vehicle is an extension portion comprised of a plurality of vertically spaced pairs of stringer members 26 rigidly interconnected by the cross-members 28 and which are secured to intermediate braces 30 and end braces 32 depending from these extensions. It will be noted that both the forward and rear ends of the vehicle are provided with frame members 34 and 36. The upper frame members 34 angle downwardly from the front and rear frame members 14 and 16, while the lower frame members 36 connect to the free ends of the members 34 and extend therefrom to points of connection on a subframe assembly hereinafter described.

A shack assembly indicated generally by the reference character 38 is mounted on the deck 18 and may contain a radio, galley or the like, or may be used for any purpose desired. Support standard members 40 are provided in rigid upstanding relation to the deck and may be utilized as supports for the awning member 42 which forms a canopy over a main portion of the deck for obvious purposes.

Figure 4:
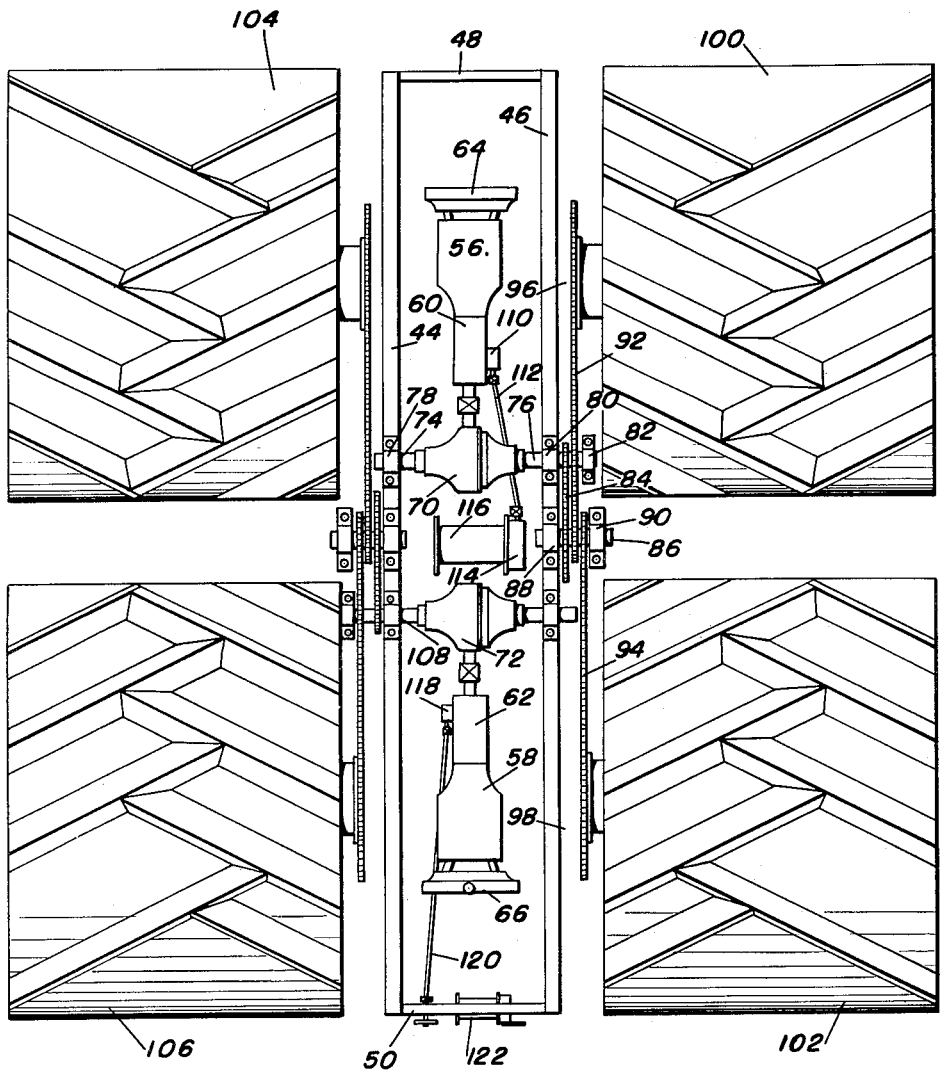
Figure 4 is a diagrammatic plan view showing the construction of the subframe assembly and the manner of mounting the power mechanism thereon.

Positioned below the fore and aft central portion of the main frame section is a subframe assembly which, as will be seen most clearly in Figure 4, incorporates spaced side frame members 44 and 46 and opposite end frame members 48 and 50. The previously mentioned braces 30 and 32 are connected with the frame members 44 and 46, respectively. The subframe is supported from the main frame section by a series of vertical hanger members 52 and 54 which depend from the main frame section opposite end members 14 and 16 and as many desired points intermediate the subframe members 44 and 46 as is desired.

First and second engine assemblies 56 and 58 are mounted in any suitable manner between the side frame members 44 and 46 of the subframe assembly and conventional transmission assemblies 60 and 62, respectively, are associated with these engines as are the respective cooling radiators 64 and 66. First and second automotive or truck rear end assemblies 70 and 72, respectively, are associated with the first and second engine assemblies, respectively. The rear end assembly 70 is provided with conventional axle shaft members 74 and 76 which are cut off at suitable lengths, with the shorter axle shaft members 74 being journaled on one side frame member 44 by a suitable bearing 78 and with the longer of the axle shafts journaled in the opposite side frame member 46 by means of a suitable bearing member 80. The two axles are locked together in any suitable manner within the differential housing for common rotation. The extreme free end of the axle shaft 76 is carried by a further bearing member 82 mounted on a side extension of the frame member 46 and between the two bearings 80 and 82, a sprocket is mounted on the axle shaft over which a flexible chain member 84 is trained. A countershaft member 86 is journaled between the bearing members 88 and 90 mounted on the side frame member 46 and its extension, respectively, and the countershaft is provided with three sprocket members, one of which receives the previously mentioned chain 84 and the other two of which have chain members 92 and 94 trained thereabout which extend therefrom to cooperate with sprocket members on the axles 96 and 98, respectively, upon which buoyant propelling wheels 100 and 102 are mounted.

The drive for opposite buoyant propelling wheels 104 and 106 from an axle member 108 of the differential assembly 72 is identical with that above described, and it will be readily apparent that in operation, the wheels at one side of the vehicle are driven entirely independent from the wheels at the opposite sides thereof, enabling the device to be very quickly and easily maneuvered.

In addition to the drive to the wheel members 100 and 102, the engine unit 56 may include a power take-off unit 110 in its transmission assembly 60 and the power take-off shaft 112 extending therefrom is connected to a winch drive assembly 114 which is, in turn, connected to the winch drive 116 for selectively rotating the same. The purpose of this winch assembly is to provide pulling power for pipe lines or the like which may be carried by the vehicle.

The other transmission assembly 62 is provided with a similar power take-off 118 and its power take-off shaft 120 is connected to a winch assembly 122 at the rearward end of the vehicle for controlling the vertical height of a ditch forming plow assembly 124 through the medium of the hoist assembly which includes the sheave block members 126 and 128 and interconnecting cable 130, one end of which is wound about the drum of the winch assembly 122. The ditcher assembly includes, in addition to the plow 124, a cutting disk 132 for cutting vegetation ahead of the plow 124, and the entire assembly is supported from a beam member 134 which is pivotally secured to the subframe assembly.

Outrigger frame portions depend from opposite sides of the main frame assembly and include the horizontal stringer 136 interconnected through a plurality of vertical members 138 to the side frame members 10 and 12, and, as will be clear from Figures 1 and 2, the outer ends of the axles 96 and 98 being resiliently connected to this frame member 136 through the medium of springs 140 and 142 which are shackled to the bracket portions 144, 146 and 148, 150, respectively.

The springs carry, through conventional U-bolt assemblies, the bearing block members 152 and 154 within which the axles are, respectively, journaled and turn-buckle assemblies 156 and 158 are respectively connected between the brackets 144 and 150 and their corresponding bearing blocks 152 and 154 for adjusting the tension of the drive chain assemblies 92 and 94.

The inner ends of the axle members are mounted to the subframe assembly in an identical manner, as will be seen most clearly in Figure 2.

For the purpose of manipulating pipes and the like, a mast member 160 is mounted on the main frame assembly at one side thereof and is reinforced by the diagonal member 162, a boom member 164 being connected to the vertical mast member 160. A winding drum 166 is driven by any suitable power means, and a cable 168 issuing therefrom passes over pulley sheave in the block members 170 and 172 for manipulating any suitable load.

In operation of the device above described, it will, of course, be apparent that the engine assemblies 56 and 58 are independently controlled, and to this end, as will be apparent from Figure 3, the entire assemblies are provided with separate throttle controls 174 and 176 and with separate clutch controls 178 and 180. When the engines are running, they may be placed in any selected gear through the transmission assemblies 60 and 62 and their clutches engaged such as to impart forward drive to the vehicle. So long as the speed of the engines 56 and 58 remains the same, a straight ahead motion will be imparted to the vehicle, whereas a differential in speed between the two engines as controlled by the throttle members 174 and 176 will effect turning of the vehicle. In this respect, it will be noted that it is possible to place one engine drive in reverse while the other one is still driving in a forward direction to effect a very rapid turning movement to the vehicle for maneuvering in locations where it would be otherwise impossible.

From the foregoing, the construction and operation of the device will be readily understood, and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a marsh buggy, a main frame section including spaced side frame members interconnected at opposite ends by end frame members, a subframe section disposed below and midway between said side frame members, said subframe including vertical hangers depending from said end frame members, and an elongated rectangular main body portion carried by said hangers, a pair of front axles and a pair of rear axles mounted on said subframe, outrigger frames depending from said main frame section side members, said axles having outer end portions journaled in said outrigger frames, buoyant wheels secured to said axles, said wheels being of such diameter as to extend to points closely adjacent the undersurface of said main frame section, first and second engine and transmission assemblies mounted in longitudinal alignment between opposite side wheels on said subframe, a first differential drive assembly driven by said first engine and including a pair of transversely extending differentially driven axle shafts, said axle shafts being connected for common rotation, means connected to one of the axle shafts and to the wheels on one side of the subframe for driving the latter, a second differential drive assembly driven by said second engine and including a pair of transversely extending differentially driven axle shafts, said latter axle shafts being connected for common rotation, and means connected to one of the last mentioned axle shafts and to the wheels on the other side of said subframe for driving the latter.

2. In a marsh buggy, a main frame section including spaced side frame members interconnected at opposite ends by end frame members, a subframe section disposed below and midway between said side frame members, said subframe including vertical hangers depending from said end frame members, and an elongated rectangular main body portion carried by said hangers, a pair of front axles and a pair of rear axles mounted on said subframe, buoyant wheels secured to said axles, said wheels being of such diameter as to extend to points closely adjacent the undersurface of said main frame section, first and second engine and transmission assemblies mounted in longitudinal alignment between opposite side wheels on said subframe, a first differential drive assembly driven by said first engine and including a pair of transversely extending differentially driven axle shafts, said axle shafts being connected for common rotation, means including flexible drive chains connected to one of the axle shafts and to the wheels on one side of the subframe for driving the latter, a second differential drive assembly driven by said second engine and including a pair of transversely extending differentially driven axle shafts, said latter axle shafts being connected for common rotation, and means including flexible drive chains connected to one of the last mentioned axle shafts and to the wheels on the other side of said subframe for driving the latter.

3. In a marsh buggy, a main frame section including spaced side frame members interconnected at opposite ends by end frame members, a subframe section disposed below and midway between said side frame members, said subframe including vertical hangers depending from said end frame members, and an elongated rectangular main body portion carried by said hangers, a pair of front axles and a pair of rear axles mounted on said subframe, outrigger frames depending from said main frame section side members, said axles having outer end portions journaled in said outrigger frames, buoyant wheels secured to said axles, said wheels being of such diameter as to extend to points closely adjacent the undersurface of said main frame section, first and second engine and transmission assemblies mounted in longitudinal alignment between opposite side wheels on said subframe, a first differential drive assembly driven by said first engine and including a pair of transversely extending differentially driven axle shafts, said axle shafts being connected for common rotation, means including flexible drive chains connected to one of the axle shafts and to the wheels on one side of the subframe for driving the latter, a second differential drive assembly driven by said second engine and including a pair of transversely extending differentially driven axle shafts, said latter axle shafts being connected for common rotation, and means including flexible drive chains connected to one of the last mentioned axle shafts and to the wheels on the other side of said subframe for driving the latter.

4. A marsh buggy as set forth in claim 1 wherein each of said engines include a power take-off shaft extending from the transmission assemblies, power winch means carried by said sub-frames, and means operatively connecting said power take-off shafts to a respective power winch.

References Cited in the file of this patent

UNITED STATES PATENTS

| | | |
|---|---|---|
| 1,254,057 | Moore | Jan. 22, 1918 |
| 1,430,251 | Parker | Sept. 26, 1922 |
| 2,671,519 | Cheramie | Mar. 9, 1954 |

FOREIGN PATENTS

| | | |
|---|---|---|
| 326,277 | Italy | May 9, 1935 |